(12) United States Patent
Son et al.

(10) Patent No.: US 8,481,846 B2
(45) Date of Patent: Jul. 9, 2013

(54) DYE SENSITIZED SOLAR CELL

(75) Inventors: Seung-Hyun Son, Suwon-si (KR);
Ji-Won Lee, Suwon-si (KR);
Moon-Sung Kang, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 328 days.

(21) Appl. No.: 12/829,662

(22) Filed: Jul. 2, 2010

(65) Prior Publication Data

US 2011/0126908 A1 Jun. 2, 2011

(30) Foreign Application Priority Data

Dec. 1, 2009 (KR) ................ 10-2009-0117836

(51) Int. Cl.
*H01L 31/0224* (2006.01)

(52) U.S. Cl.
USPC ..................... 136/256; 136/250; 136/259

(58) Field of Classification Search
USPC ............... 136/243, 244, 251, 250, 252, 259, 136/256
See application file for complete search history.

(56) References Cited

U.S. PATENT DOCUMENTS

| 6,069,313 | A | * | 5/2000 | Kay | 136/249 |
| 2003/0056821 | A1 | * | 3/2003 | Chittibabu et al. | 136/250 |
| 2005/0072458 | A1 | * | 4/2005 | Goldstein | 136/251 |
| 2007/0056628 | A1 | | 3/2007 | Park et al. | |
| 2007/0079869 | A1 | | 4/2007 | Yukinobu | |
| 2007/0246096 | A1 | | 10/2007 | Fujimaki | |
| 2007/0251574 | A1 | | 11/2007 | Fujimaki et al. | |
| 2008/0271843 | A1 | | 11/2008 | Yukinobu | |

FOREIGN PATENT DOCUMENTS

| EP | 1770728 A2 | 4/2007 |
| JP | 2004-319383 | 11/2004 |
| JP | 2007-220608 | 8/2007 |
| JP | 2008-287893 | 11/2008 |

OTHER PUBLICATIONS

Korean Office action issued by Korean Patent Office on Sep. 29, 2011, corresponding to KR Application No. 10-2009-0117836 and Request for Entry attached herewith.
The Extended European Search Report issued by European Patent Office on Aug. 30, 2011, corresponding to EP 10190499.3 attached herewith.

* cited by examiner

*Primary Examiner* — Jonathan Johnson
*Assistant Examiner* — Christina Chern
(74) *Attorney, Agent, or Firm* — Robert E. Bushnell, Esq.

(57) ABSTRACT

A dye-sensitized solar cell that includes a semiconductor layer, to which a photosensitive dye generating electrons is adhered; a photo electrode disposed on a side of the semiconductor layer so as to transfer electrons; and an auxiliary electrode disposed on the other side of the semiconductor layer so as to transfer the electrons, and at least one semiconductor layer and at least one auxiliary electrode are stacked alternatively. Thus, an amount of molecules of the photosensitive dye may be increased without increasing the moving distance of electrons, and the efficiency of the solar cell may be increased.

10 Claims, 1 Drawing Sheet

DYE SENSITIZED SOLAR CELL

RELATED APPLICATIONS

This application claims the benefit of Korean Patent Application No. 10-2009-0117836, filed on Dec. 1, 2009, in the Korean Intellectual Property Office, the disclosure of which is incorporated herein in its entirety by reference.

BACKGROUND

1. Field

The general inventive concept relates to a dye sensitized solar cell.

2. Description of the Related Art

The above information disclosed in this Related Art section is only for enhancement of understanding of the background of the invention and therefore it may contain information that does not form the prior art that is already known to a person of ordinary skill in the art.

SUMMARY

Aspects of the present invention include an improved dye-sensitized solar cell which may increase the amount of dye molecules while preventing the moving distance of electrons from increasing.

Additional aspects will be set forth in part in the description which follows and, in part, will be apparent from the description, or may be learned by practice of the presented embodiments.

According to exemplary embodiments of the present invention, a dye-sensitized solar cell may be fabricated with a semiconductor layer, to which a photosensitive dye generating electrons is adhered; a photo electrode disposed on a side of the semiconductor layer so as to transfer the electrons; and an auxiliary electrode disposed on the other side of the semiconductor layer so as to transfer the electrons. At least one semiconductor layer and at least one auxiliary electrode are stacked alternatively.

The dye-sensitized solar cell may further include an electrolyte for reducing the photosensitive dye, and the auxiliary electrode may include a plurality of holes, through which the electrolyte is transmitted.

The dye-sensitized solar cell may further include a counter electrode to which the electrons are moved via an external circuit from the photo electrode. The counter electrode may further include a catalyst layer for accelerating the reduction of the electrolyte. The dye-sensitized solar cell may further include glass layers disposed on an outer portion of the photo electrode and an outer portion of the counter electrode.

The semiconductor layer may be formed of titanium dioxide ($TiO_2$), the auxiliary electrode is formed of Ti, and the photo electrode is formed of fluorine-doped tin oxide (FTO).

BRIEF DESCRIPTION OF THE DRAWINGS

A more complete appreciation of these and other aspects, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

Figure 1:
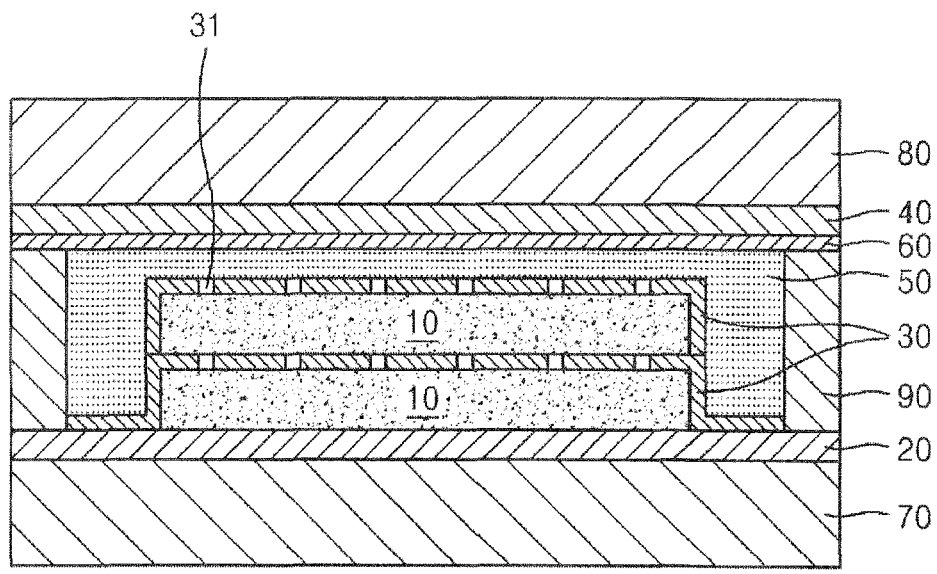
FIG. 1 is a cross-sectional view of a dye-sensitized solar cell according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In general, dye sensitized solar cells use photosensitive dye that generates electron-hole pairs by absorbing solar energy of visible rays. The photosensitive dye may be adhered on a metal oxide semiconductor layer such as titanium dioxide ($TiO_2$). When solar light is absorbed by the photosensitive dye, molecules of the photosensitive dye are transited from a base state to an excited state to generate electron-hole pairs, and the excited electrons are injected into a conduction band of the semiconductor layer and moved to an adjacent electrode, that is, a photo electrode. Then, the excited electrons are moved to a counter electrode, that is, a positive electrode, via an external circuit. In addition, molecules of the dye which are oxidized by the transition of electrons are reduced in an electrolyte, and electrolytic ion oxidized by the reduction of dye molecules is reduced by reaction with electrons that have reached a counter electrode.

As described above, dye-sensitized solar cell performs as a battery basically by inducing generation, transition, and reduction of electrons caused by the photosensitive dye absorbing solar light.

Therefore, when the amount of generated electrons is increased, the higher the efficiency of the dye-sensitized solar cell. To accomplish this the semiconductor layer may be made thicker in order to increase an amount of the photosensitive dye adhering to the semiconductor layer. However, when the semiconductor layer becomes thicker, the moving distance of the electrons which moves to the photo electrode is also increased. Thus, the efficiency of the solar cell may be degraded.

Therefore, in order to improve the efficiency of the solar cell, an appropriate structure that may increase the amount of the photosensitive dye while reducing the moving distance of electrons is required.

FIG. 1 is a cross-sectional view of a dye-sensitized solar cell according to an embodiment of the present invention. Referring to FIG. 1, the dye-sensitized solar cell of this embodiment includes a semiconductor layer 10 to which a photosensitive dye is adhered, a photo electrode 20 and an auxiliary electrode 30 disposed to contact a side and the other side of the semiconductor layer 10, and a counter electrode 40 connecting to the photo electrode 20 via an external circuit (not shown).

End portions of the photo electrode 20 and the auxiliary electrode 30 are electrically connected to each other so that electrons generated in the semiconductor layer 10 may freely move therethrough. Therefore, electrons generated in the semiconductor layer 10 may move to any of the photo electrode 20 and the auxiliary electrode 30, and then, the electrons may move toward the counter electrode 40 via the external circuit that is connected to the photo electrode 20. That is, the photo electrode 20 and the auxiliary electrode 30 may perform as a negative electrode surrounding the semiconductor layer 10. Then, even when the semiconductor layer 10 is made thicker, for example, twice the original thickness of the semiconductor layer 10, the moving distance of the electrons in the semiconductor layer 10 rarely changes. That is, the photo electrode contacts only a side of the semiconductor layer in the conventional dye-sensitized solar cell, and thus, when the thickness of the semiconductor layer is increased, the distance for the electrons generated on a portion apart from the photo electrode to reach the photo electrode 20 across the inside of the semiconductor layer is also increased. However, when the photo electrode 20 and the auxiliary electrode 30 surround the semiconductor layer 10, as in this embodiment, the electrons generated in the semiconductor layer 10 may move to any of the photo electrode 20 and the auxiliary electrode 30 surrounding the semiconductor layer 10, and thus, the moving distance of the electrons does not increase even if the thickness of the semiconductor layer 10 doubles. Here, the semiconductor layer 10 may be formed of $TiO_2$, the photo electrode 20 may be formed of fluorine doped tin oxide (FTO), and the auxiliary electrode 30 may be formed of Ti.

In addition, the dye-sensitized solar cell of this embodiment includes the structure, in which the semiconductor layer 10 and the auxiliary electrode 30 are repeatedly stacked. As described above, the amount of photosensitive dye adhered on the semiconductor layer 10 may be increased by increasing the thickness of one semiconductor layer 10. However, multiple semiconductor layers 10 may be stacked in order to increase the adhered amount of the photosensitive dye even more.

Reference numeral 50 denotes an electrolyte, which reduces the photosensitive dye molecules that are oxidized by the generation of electrons. Since the electrolyte 50 contacts the semiconductor layer 10 in order to generate the reduction, the auxiliary electrode 30 may include a plurality of holes 31, through which the electrolyte 50 are transmitted. In addition, since the semiconductor layer 10 is a porous oxide semiconductor, the semiconductor layer 10 may transmit the electrolyte 50 without using holes. Therefore, the electrolyte 50 may contact the multiple semiconductor layers 10 to generate the reduction.

Reference numeral 60 denotes a platinum catalyst layer for accelerating the reduction reaction of the electrolyte 50. That is, the electrolyte 50 is oxidized according to the reduction of the semiconductor layer 10, and then, the electrolyte 50 is reduced by the reaction with the electrons which have reached the counter electrode 40 from the photo electrode 20. The catalyst layer 60 accelerates the reduction.

Reference numerals 70 and 80 denote glass layers which are installed outside of the photo electrode 20 and the counter electrode 40 in order to protect internal elements. Reference numeral 90 denotes a sealing member for sealing the electrolyte 50.

The dye-sensitized solar cell having the above structure operates as follows.

When solar light is irradiated onto the solar cell, molecules of the photosensitive dye adhered on the semiconductor layer 10 absorb the solar energy of visible ray area to generate electrons. Here, the generated electrons move to the photo electrode 20 or the auxiliary electrode 30 which surround the semiconductor layer 10. In addition, the electrons move to the counter electrode 40 via the external circuit (not shown) connected to the photo electrode 20, and then, a load may be connected to the external circuit to use the solar cell.

In addition, the molecules of the photosensitive dye which are oxidized by the generation of electrons are reduced by the reaction with the electrolyte 50, and the electrolyte 50 which is oxidized due to the reduction of the photosensitive dye molecules is reduced by the reaction with the electrons that have reached the counter electrode 40.

The solar cell is operated by the above circulation mechanism of electrons, and the generated amount of electrons is increased much more than that of the conventional solar cell. That is, as described above, the thickness of the semiconductor layer 10 may be increased by additionally forming the auxiliary electrode 30, and thus, adhesion amount of the photosensitive dye may be increased. Furthermore, multiple semiconductor layers 10 are stacked, and thus, the molecules of the photosensitive dye generating the electrons are greatly increased. When the generated amount of electrons is increased, the electrons transferring through the external circuit also increase, and then, the efficiency of the solar cell is improved. In addition, as described above, the moving distance of the electrons 10 transmitting through the semiconductor layer 10 to the photo electrode 20 or the auxiliary electrode 30 does not increase.

Figure 2:
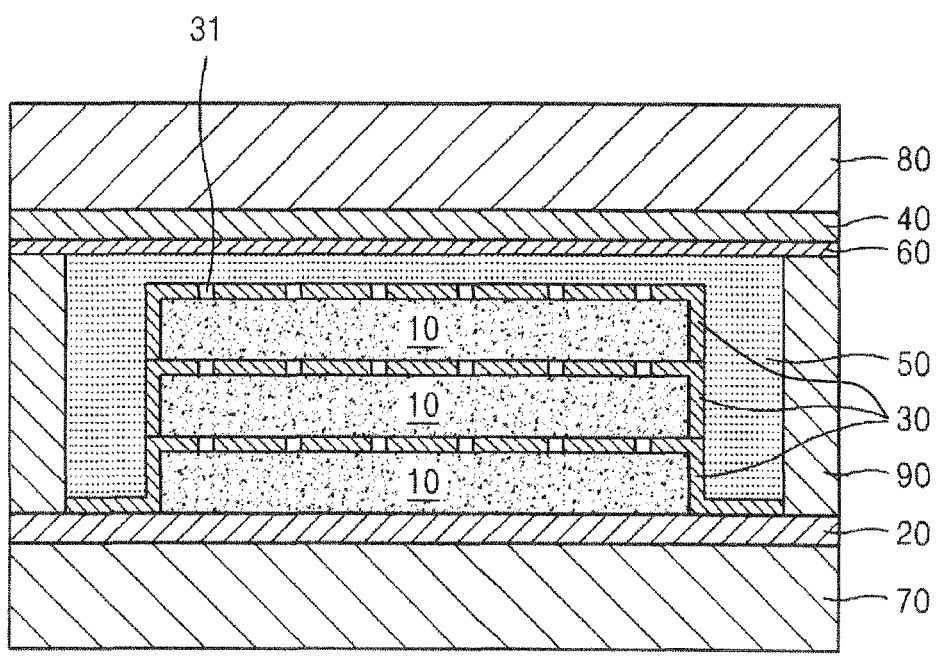
FIG. 2 is a cross-sectional view of a dye-sensitized solar cell according to another embodiment of the present invention.

On the other hand, two semiconductor layers 10 are stacked in this embodiment, however, three or more semiconductor layers 10 may be stacked as shown in FIG. 2.

Therefore, according to the dye-sensitized solar cell having the above described structure, the amount of photosensitive dye molecules is greatly increased without increasing the moving distance of the electrons, and thus, the cell efficiency may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A dye-sensitized solar cell comprising:
   at least one semiconductor layer, to which a photosensitive dye generating electrons is adhered;
   an electrolyte for reducing the photosensitive dye;
   a photo electrode disposed on a side of the semiconductor layer so as to transfer the electrons; and
   at least one auxiliary electrode having a top side and two end sides disposed on another side of the semiconductor layer, said at least one auxiliary electrode is composed of Ti so as to transfer the electrons;
   wherein the at least one auxiliary electrode includes a plurality of holes solely on the top side of the at least one auxiliary electrode, through which the electrolyte is transmitted, wherein said at least one semiconductor layer and said at least one auxiliary electrode are stacked alternatively.

2. The dye-sensitized solar cell of claim 1, further comprising a counter electrode to which the electrons are moved via an external circuit from the photo electrode.

3. The dye-sensitized solar cell of claim 2, wherein the counter electrode further includes a catalyst layer for accelerating the reduction of the electrolyte.

4. The dye-sensitized solar cell of claim 3, further comprising glass layers disposed on an outer portion of the photo electrode and an outer portion of the counter electrode.

5. The dye-sensitized solar cell of claim 1, wherein the at least one semiconductor layer is formed of titanium dioxide ($TiO_2$), the at least one auxiliary electrode is formed of Ti, and the photo electrode is formed of fluorine-doped tin oxide (FTO).

6. A dye-sensitized solar cell comprising:
   a plurality of semiconductor layers each having a rectangular shape with a top side, a bottom side and two end sides;
   a photosensitive dye adhering to each of the plurality of semiconductor layers that generates electrons upon exposure to light;
   an electrolyte for reducing the photosensitive dye;
   a photo electrode disposed on a bottom side of a single semiconductor layer of the plurality of semiconductor layers so as to transfer the electrons; and
   a plurality of auxiliary electrodes each having a top side and two end sides disposed on the top side and both end sides of each of the plurality of semiconductor layers so as to transfer the electrons, the plurality of auxiliary electrodes are composed of Ti and include a plurality of holes solely on the top side of each of the plurality of auxiliary electrodes, through which the electrolyte is transmitted;
   wherein each semiconductor layer of the plurality of semiconductor layers and each auxiliary electrode of the plurality of auxiliary electrodes are alternately stacked.

7. The dye-sensitized solar cell of claim 6, further comprising:
   a counter electrode to which the electrons are moved via an external circuit from the photo electrode.

8. The dye-sensitized solar cell of claim 7, wherein the counter electrode further comprises:
   a catalyst layer that accelerates the reduction of the electrolyte.

9. The dye-sensitized solar cell of claim 8, further comprising:
   glass layers disposed on an outer portion of the photo electrode and an outer portion of the counter electrode.

10. The dye-sensitized solar cell of claim 6, wherein the plurality of semiconductor layers is formed of titanium dioxide ($TiO_2$), the plurality of auxiliary electrodes are formed of Ti, and the photo electrode is formed of fluorine-doped tin oxide (FTO).

* * * * *